United States Patent

Krude et al.

Patent Number: 5,852,864
Date of Patent: Dec. 29, 1998

[54] CONSTANT VELOCITY UNIVERSAL BALL JOINT AND METHOD OF PRODUCING SUCH A JOINT

[75] Inventors: Werner Krude, Neunkirchen-Wolperath; Peter Harz, Hennef, both of Germany

[73] Assignee: GKN Automotive AG, Lohmar, Germany

[21] Appl. No.: 506,906

[22] Filed: Jul. 26, 1995

Related U.S. Application Data

[62] Division of Ser. No. 65,636, May 21, 1993, Pat. No. 5,451,185.

[30] Foreign Application Priority Data

May 26, 1992 [DE] Germany ................ 42 17 322.1

[51] Int. Cl.⁶ .................................................. F16D 3/223
[52] U.S. Cl. ........................................ 29/437; 29/898.061
[58] Field of Search ..................... 29/441.1, 437, 29/438, 898.061, 898.062, 898.064; 464/145, 906

[56] References Cited

U.S. PATENT DOCUMENTS

| | | | |
|---|---|---|---|
| 3,241,226 | 3/1966 | Jorgji ........................... | 29/441.1 |
| 3,982,843 | 9/1976 | Sirek ............................ | 29/441.1 X |
| 3,986,250 | 10/1976 | Belsoorf ...................... | 29/441.1 X |
| 4,191,031 | 3/1980 | Girguis et al. . | |
| 4,608,028 | 8/1986 | Welschof et al. . | |
| 4,698,047 | 10/1987 | Welschof et al. . | |
| 4,861,316 | 8/1989 | Welschof . | |
| 4,950,206 | 8/1990 | Jacob ........................... | 464/145 X |

FOREIGN PATENT DOCUMENTS

| | | |
|---|---|---|
| 2064807 | 6/1972 | France . |
| 3216475 | 6/1976 | France . |
| 2044724 | 12/1972 | Germany . |
| 2430027 | 5/1975 | Germany . |
| 2522670 | 5/1976 | Germany . |
| 2611218 | 10/1977 | Germany . |
| 8524285 | 11/1985 | Germany . |
| 3606075 | 8/1986 | Germany . |
| 3626998 | 2/1988 | Germany . |
| 3132363 | 6/1990 | Germany . |
| 53-067045 | 6/1978 | Japan . |
| 62-063221 | 3/1987 | Japan . |
| 2208698 | 4/1989 | United Kingdom . |

*Primary Examiner*—Joseph M. Gorski
*Attorney, Agent, or Firm*—Harness, Dickey & Pierce, P.L.C.

[57] ABSTRACT

A constant velocity universal ball joint has a bell-shaped outer joint part which is open at one end. The outer joint part includes longitudinally extending circumferentially distributed outer ball tracks. An inner joint part with longitudinally extending circumferentially distributed inner ball tracks is positioned within the outer part such that the outer and inner tracks are arranged radially opposite one another to form pairs. A torque transmitting ball is received in each track pair. A cage is arranged between the outer joint part and the inner joint part and holds the balls in a common plane in circumferentially distributed cage windows. The cage guides the balls on to the angle bisecting plane when the axes of the outer and inner joint part are articulated relative to one another. The outer joint part is produced, especially by extrusion, forging or deep-drawing. The forming provides outer ball tracks which, if viewed from the open end, are axially undercut-free. Inner faces are positioned between the outer ball tracks. The outer part includes wall regions which start from the open end, are axially limited, are deformed radially inwardly, and are arranged between two outer ball tracks. The wall regions, whose width is smaller than the circumferentially directed distance between the respective outer ball tracks, are deformed. The deformed wall regions each form cage guiding faces positioned between the outer ball tracks and provide support towards the open end.

13 Claims, 7 Drawing Sheets

CONSTANT VELOCITY UNIVERSAL BALL JOINT AND METHOD OF PRODUCING SUCH A JOINT

This is a division of U.S. Pat. application Ser. No. 08/065,636, filed May 21, 1993, and now U.S. Pat. No. 5,451,185.

BACKGROUND OF THE INVENTION

The present invention relates to a constant velocity universal ball joint and a method of producing the same. The joint has a bell-shaped outer joint part which is open at one end. The outer joint part includes longitudinally extending circumferentially distributed outer ball tracks. An inner joint part which includes longitudinally extending circumferentially distributed inner ball tracks is positioned within the outer part. The outer and inner tracks are arranged radially opposite one another to form pairs. In each case, the opposing tracks receive a torque transmitting ball. A cage is arranged between the outer joint part and the inner joint part. The cage holds the balls in a common plane in circumferentially distributed cage windows and guides the balls onto the angle bisecting plane when the axes of the outer and inner joint part are articulated relative to one another. The outer joint part is preferably produced by extrusion, forging or deep-drawing. The outer ball tracks, if viewed from the open end, are axially undercut-free and inner faces are positioned between the outer ball tracks.

Joints of this type are the so-called UF joints (undercut-free joints). In UF joints, one side of the outer joint part is closed by a joint base, whereas the opposed other open end, in an axial view, includes outer joint tracks which, from the outside, are undercut-free. The cage and thus the inner joint part are either directly inwardly supported relative to the outer joint part on cage guiding faces provided in the outer joint part between the ball tracks, or indirectly supported via the balls on which the cage is directly supported via the walls of its cage window.

When viewing the track shape supporting the cage, if viewed from the open joint end, and thus the inner joint part relative to the outer joint part, the outer joint part requires outer joint part faces which are provided with an undercut. From DE-PS 25 22 670, it is known to provide a separate annular member at the outer joint part. This measure is complicated and unsatisfactory from a strength point of view. In the case of a one-piece design, producing the latter cage guiding faces of the above-mentioned joint type is extremely complicated and expensive.

If a joint of this type is produced with a one-piece outer joint part with cage guiding faces which include an undercut, the assembly of the inner joint part, cage and outer joint part involves complicated operational movements where the axes of the parts are positioned to intersect one another and parts of the cage guiding faces are inserted into the cage windows.

SUMMARY OF THE INVENTION

It is an object of the present invention to provide joints of the above type which, without suffering functional disadvantages, are more stable and cost-effective. The invention also provides a method of producing joints which simplifies assembly and enable hardening of the outer ball tracks, wherein the hardening operation is carried out without any adverse effects.

A preferred joint has an outer joint part with wall regions which start from the open end, are axially limited, deformed radially inwardly, and arranged between two outer ball tracks. In each case, the width of the wall region is smaller than the circumferentially directed distance between the respective outer ball tracks. The deformed wall regions each form cage guiding faces which are positioned between the outer ball tracks. So, the deformed wall regions provide support towards the open end.

With joints of this design, advantageously the cost of producing the undercut cage guiding faces is reduced considerably. The method of the invention enables at least the cage and the inner joint part, optionally preassembled with the balls, to be inserted coaxially into the outer joint part and thereafter, axially limited regions starting from the open end of the outer joint part are deformed radially inwardly at the outer joint part. The regions are arranged between two outer ball tracks in each case and have a width which is smaller than the circumferentially directed distance between the respective outer ball tracks. The deformed regions, on the inside, form cage guiding faces which are positioned between the outer ball tracks and which provide support towards the open end.

The method enables the inner joint part and cage to be axially fitted inside the outer joint part. This way of assembling eliminates any need for complicated rotational movements involving intersecting axes of the outer joint part and cage. Also, the deformation operation in accordance with the invention enables the cage play to be set at the same time. There is no need for complementary tolerances of the individual components to be determined and balanced for the cage play. The production method in accordance with the invention enables a direct adjustment between the outer joint part and the assembled cage. Slight elastic re-formation may be desirable for adjusting the required cage play. For the purpose of influencing the degree of elastic re-formation, it is possible, in a preferred embodiment, to carry out the deformation operation at the outer joint part while heating at least certain regions.

If, in accordance with a first type of production method, the inner joint part and cage, excluding the balls, are introduced into the outer joint part in a preassembled unit, with the outer joint part being deformed in limited regions, it is possible to adjust the cage relative to the outer joint part such that the longitudinally extending webs between the windows are arranged exactly underneath the outer joint part regions located centrally between the ball tracks.

If the preassembled inner joint part and cage are introduced into the outer joint part and with the balls already inserted, the cage, whose rotational movement with an extended joint is limited, should be aligned such that the balls are positioned in the centers of the windows. Thus, the longitudinally extending webs between the windows are located within the regions to be deformed. With this type of assembly, it is possible to provide a ball cage whose windows, in the circumferential direction, are only determined by the working angle of the joint. In consequence, the cage windows do not require any additional circumferential length for setting the assembling angle. With identical external dimensions, the fracture strength of the cage increases. Thus, it may be possible, in certain applications involving a given maximum load, to change over to a smaller joint size.

It is proposed to harden the outer ball tracks in advance of the deformation process. Furthermore, it is proposed to harden the inner face of the outer joint part at least in the region of the initially undercut-free cage guiding faces. Any cracks formed during the subsequent radial deformation operation are harmless and acceptable. However, it is also possible to harden the deformed regions individually after the deformation process, with the joint being in the articulated condition. Thus, this way avoids the formation of cracks.

In accordance with the first of several possibilities, the wall regions of the outer joint part are deformed so that a constant transition is formed towards the circumferentially adjoining undeformed partial regions which accommodate the ball tracks. It is presupposed that the material in the regions of transition flows such that the edges of the ball tracks are not affected. In the case of a thick-walled outer joint part, particularly easy deformability of the regions to be deformed may be achieved due to a reduced wall thickness. Thus, it is possible to provide outer grooves or open recesses introduced from the end face of the outer joint part which radially divide the wall. In such a case, it is only the radially inner wall section which is inwardly deformed.

According to a second type of deformation process, the limited regions to be deformed, starting from the open end of the outer joint part, are sheared off radially from the circumferentially intermediate regions containing the ball tracks. This forms individual radially inwardly deformed tongues. This can be achieved through choice of material, tool design or by previously designing the outer joint part accordingly. For instance, the inner and/or outer face of the outer joint part may be provided with axial cuts, grooves or the like starting from the open-end face of the outer joint part.

To ensure in the case of a UF joint, that the ball tracks remain axially undercut-free, it is proposed to provide suitable supporting means. For example, during the deformation process, supporting fingers may be introduced into the ball tracks from the open end and/or an external supporting ring may prevent the track regions from being bulged. The outer joint part may be provided in the form of a forged or extruded part with a shaft journal provided at the joint base. The shaft journal may be integrally produced with the outer joint part. Alternatively, the outer joint part may also be provided in the form of an axially undercut-free deep-drawn part with the adjoining joint journal formed in a hollow design. However, it is also possible to punch out an inner aperture in the base and weld a hollow or solid shaft journal into the inner aperture.

From the following detailed description taken in conjunction with the accompanying drawings and subjoined claims, other objects and advantages of the present invention will become apparent to those skilled in the art.

BRIEF DESCRIPTION OF THE DRAWINGS

Below, preferred embodiments of the invention are illustrated in the drawing of which.

DETAILED DESCRIPTION OF THE PREFERRED EMBODIMENTS

FIGS. 1 to 6, which will be described jointly, show an outer joint part (FIGS. 1 and 2) and a complete joint including the outer joint part, inner joint part, ball cage and balls (FIGS. 3 to 6).

An outer joint part 1, at one end, has a base 2 with an adjoining joint journal 3. Opposite the base 2, is an aperture 4. The outer joint part 1, as viewed from the aperture 4, has undercut-free ball tracks 5. Between two ball track 5, the outer joint part 1, viewed from the aperture 4, includes inner faces 6 which, initially, are produced to be undercut-free (FIGS. 1 and 2).

Figure 3:
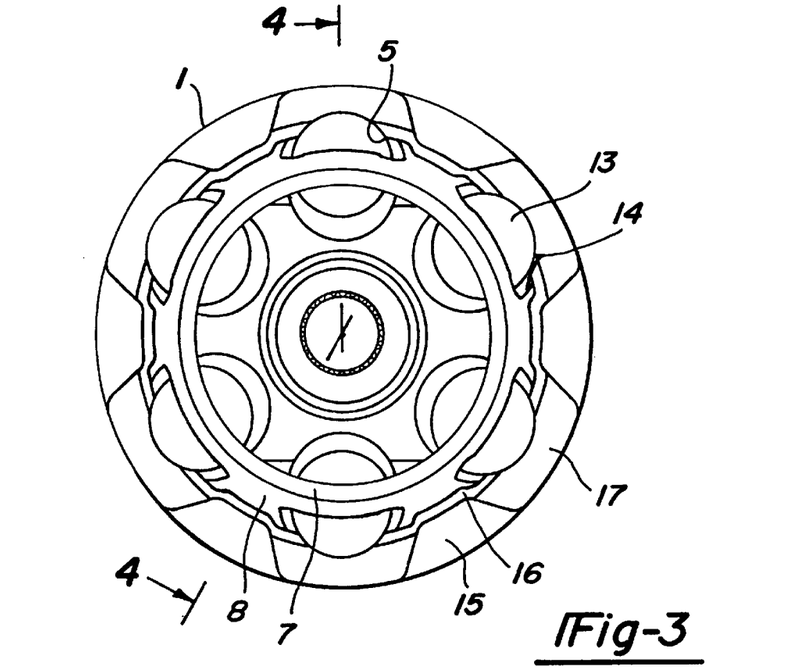
FIG. 3 is an axial view like FIG. 1 after having been assembled and deformed.

A ball cage 7, together with an accommodated inner joint part 9, is axially inserted into the outer joint part 1 (FIGS. 3 to 6). If viewed from the aperture 4, the inner joint part 9 includes undercut-free ball tracks 10. The inner joint part 9 has spherical guiding faces 11 via which it is guided in the inner spherical face 12 of the cage 7. The tracks 5, 10 of the outer joint part 1 and inner joint part 9, respectively, accommodate balls 13 in circumferentially distributed cage windows 14. On its outside, the outer joint part 1 includes individual circumferentially distributed axially limited recesses 15. The recesses 15 start from the aperture and lead to wall regions 16. The wall regions 16 have a reduced wall thickness in each case and are located between two regions 17 in which the ball tracks 5 are formed, as seen in FIG. 3.

Figure 1:
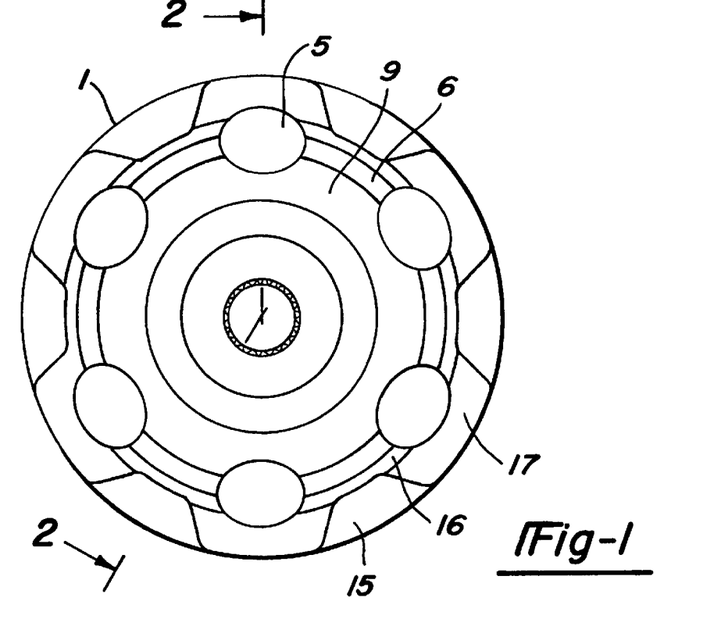
FIG. 1 is an axial view of a first embodiment of an outer joint part in accordance with the invention, prior to being deformed.
Figure 2:
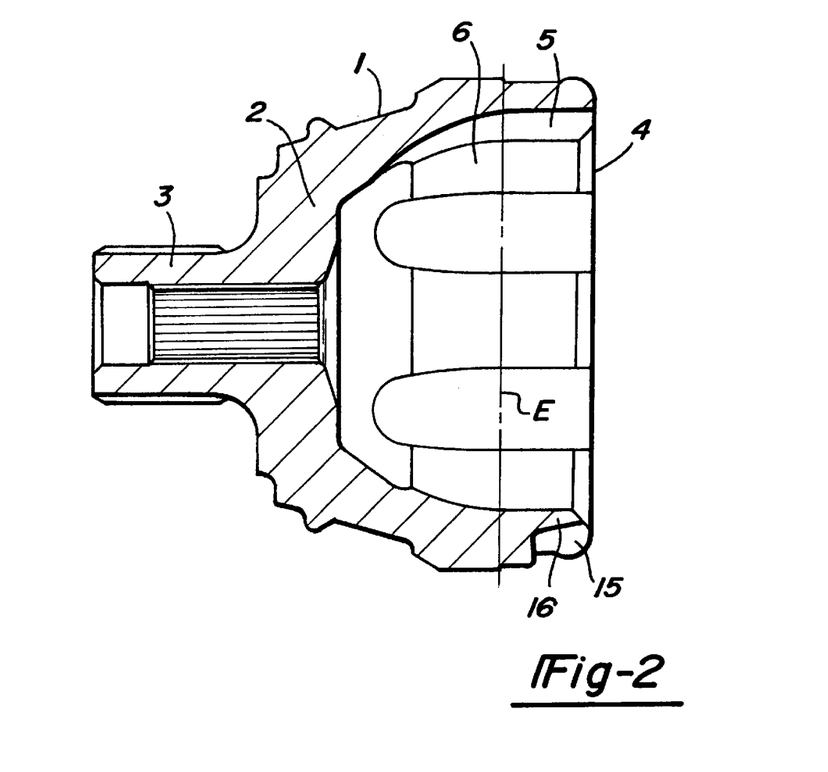
FIG. 2 is a longitudinal section view of FIG. 1 through line 2—2 thereof.

In FIGS. 1 and 2, the inner face 6 in the outer joint part is designed to be cylindrical from the aperture 4 to the central plane E where the balls are held by the cage. If viewed from the aperture 4, the inner face 6 is axially undercut-free. In consequence, the inner joint part, cage and balls, in the position as indicated, may be inserted into the outer joint part in a condition where they are coaxially aligned relative to one another.

Figure 4:
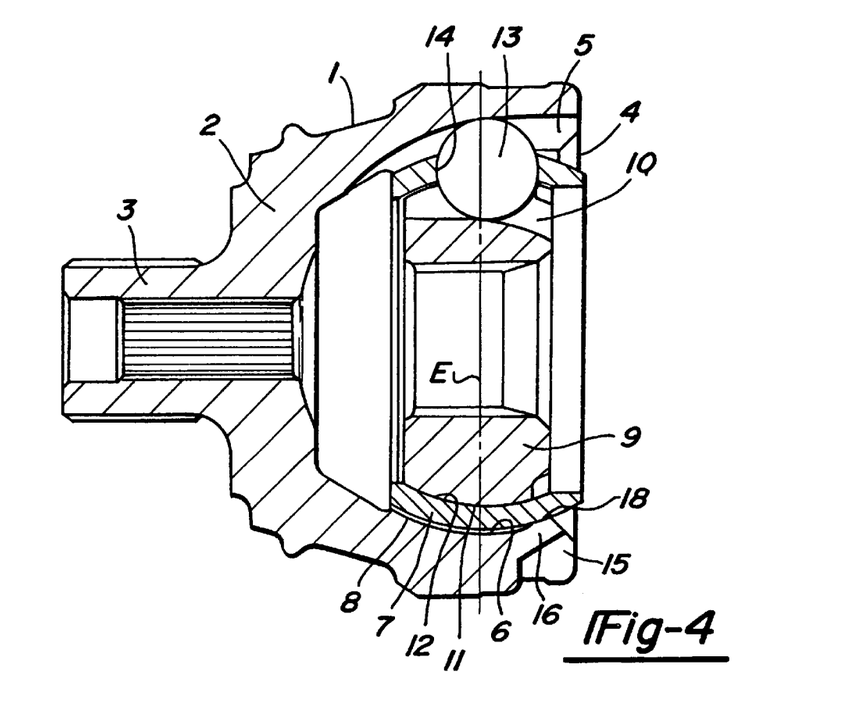
FIG. 4 is a longitudinal section view of FIG. 3 through line 4—4 thereof.

FIGS. 3 and 4 show the same joint after the final production stage in the process where the regions of reduced wall thickness 16, within the recesses 15, are deformed radially inwardly until they come into contact with the spherical outer face 8 of the cage. Thus, the reduced walls 16 form cage guiding faces 18 which support the cage axially outwardly towards the aperture 4. The cage is supported indirectly axially inwardly towards the base 2 via the cage windows 14, on the balls 13 which, in turn, are supported on the outer ball tracks 5. The regions 17 which are positioned between the wall regions 16 and accommodate the ball tracks 5 remain undeformed while constant transitions have been formed between the respective wall regions. The edges of the tracks 5 in the outer joint part 1 have remained unaffected by deformation. The same applies to the tracks 5 as a whole, whose axially undercut-free extension in the longitudinal section is retained.

Figure 5:
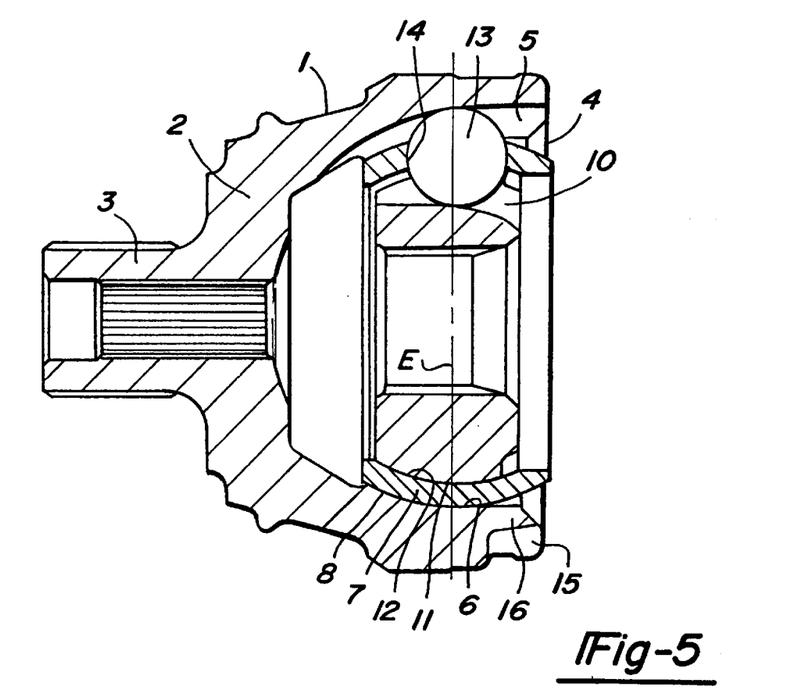
FIG. 5 is a longitudinal section view similar to FIG. 4, after assembly of the joint, but prior to the deformation of the outer joint part.
Figure 6:
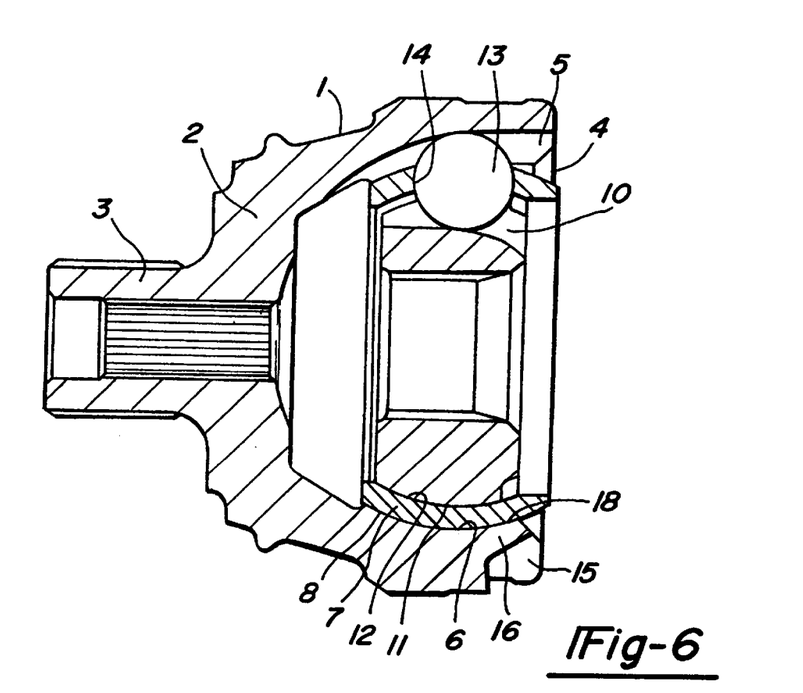
FIG. 6 is a longitudinal section view similar to FIG. 5, after deformation of the outer joint part.

FIGS. 5 and 6 illustrate a joint which is designed slightly different. Prior to the final deformation process, the cage is inserted into the outer joint part until it is directly axially inwardly supported on the inner face 6 of the outer joint part 1 (FIG. 5). This type of support is maintained after deformation of the outer joint part, after which operation, the cage, in addition, is supported axially outwardly on the resulting cage guiding faces 18 (FIG. 6).

Figure 7:
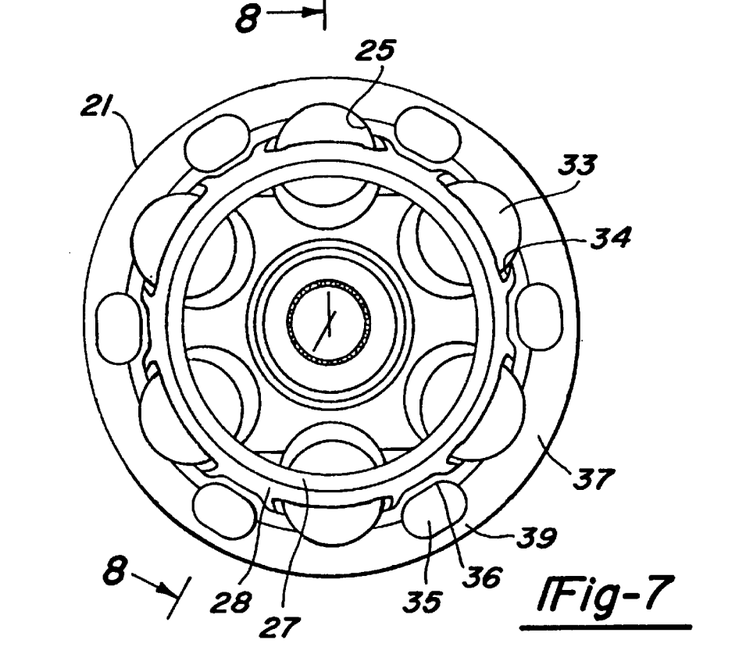
FIG. 7 is an axial view of a second embodiment of an outer joint part in accordance with the invention, after having been assembled and deformed.
Figure 8:
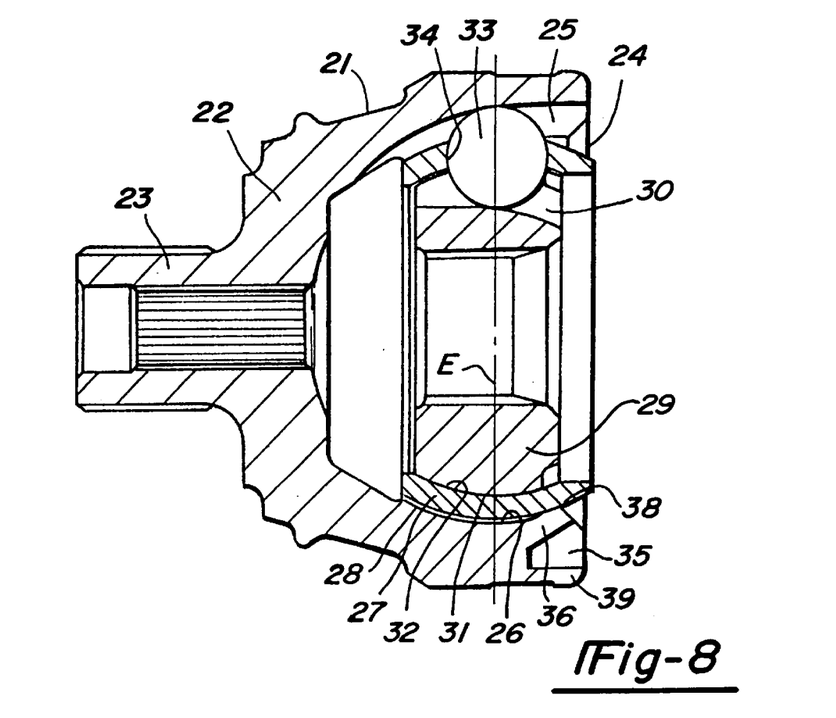
FIG. 8 is a longitudinal section view of FIG. 7 through line 8—8 thereof.

FIGS. 7 and 8 illustrate a second embodiment of a finish-produced joint. Parts corresponding to those shown in FIGS. 3 and 4 are provided with reference numbers increased by 20. Reference is made to the contents of the description of FIGS. 3 and 4. In deviation therefrom, the regions 36, with a reduced wall thickness, are produced through apertures 35 starting from the end face of the outer joint part 21. At the same time, apertures 35 provide outer wall regions 39. In the case of the finish-produced joint, only the inner regions 36 are deformed radially inwardly, whereas the outer wall regions 39 remain undeformed.

Figure 9:
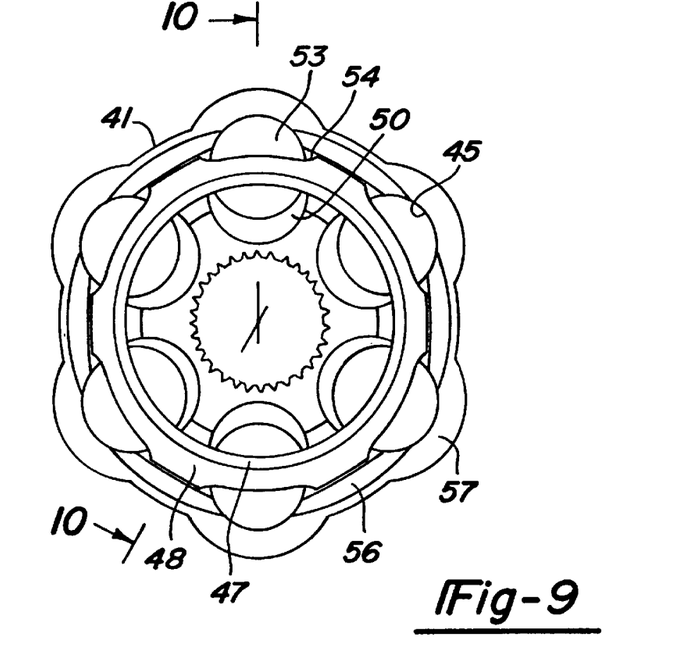
FIG. 9 is an axial view of a third embodiment of a joint in accordance with the invention, after having been assembled, but prior to the deformation of the outer joint part.
Figure 10:
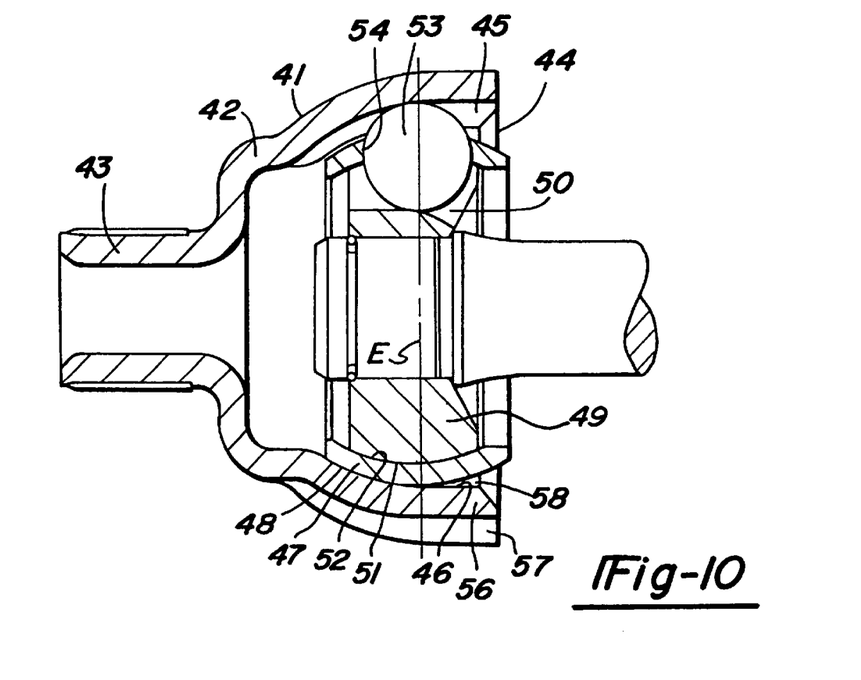
FIG. 10 is a longitudinal section view of FIG. 9 through line 10—10 thereof.

FIGS. 9 and 10 which, below, will be described jointly each show a complete joint prior to the final production stage with an outer joint part, an inner joint part, a ball cage and balls. The outer joint part 41 is designed as a deep-drawn plate metal part and, at one end, includes a base 42 with a formed-on joint journal 43. Opposite the cage is an aperture 44. The outer joint part 41, viewed from the aperture, includes undercut-free ball tracks 45. Between two ball tracks 45, the outer joint part, viewed from the aperture, includes inner faces 46 which, initially, are produced to be undercut-free and are positioned at a distance from the spherical outer face 48 of the cage 47.

The cage 47 and the inner joint part 49, in a preassembled condition, are jointly axially inserted into the outer joint part. The inner joint part 49 viewed from the aperture, is undercut-free and includes ball tracks 50. The inner joint part 49 has spherical guiding faces 51 via which it is guided on the inner spherical face 52 of the cage 47. The tracks 45, 50 of the outer joint part 41 and inner joint part 49, respectively, accommodate balls 53 in circumferentially distributed cage windows 54. The inner joint part 49 is supported inwardly, towards the joint base 42, via guiding faces 51, on the inner spherical face 52 of the cage which, in turn, is supported via cage windows 54 on the balls 53 located in the track 45 of the outer joint part 41. The outer joint part includes circumferentially distributed radially deformed wall regions 56. The wall regions 56, on the inside, form the cage guiding faces 58 which, indirectly via the ball cage 47, axially outwardly support the inner joint part 49. Radial regions 47 containing the ball tracks 45 are provided between each two regions 46.

In FIGS. 9 and 10, the inner faces 46 in the outer joint part are designed to be cylindrical from the aperture 44 to the central plane E in which the balls are held by the cage. When viewed from the aperture 44, the inner faces 46 are axially undercut-free. As a result, the inner joint part, cage and balls, in the position as indicated, may be inserted into the outer joint part in a condition where they are coaxially aligned relative to one another.

Figure 11:
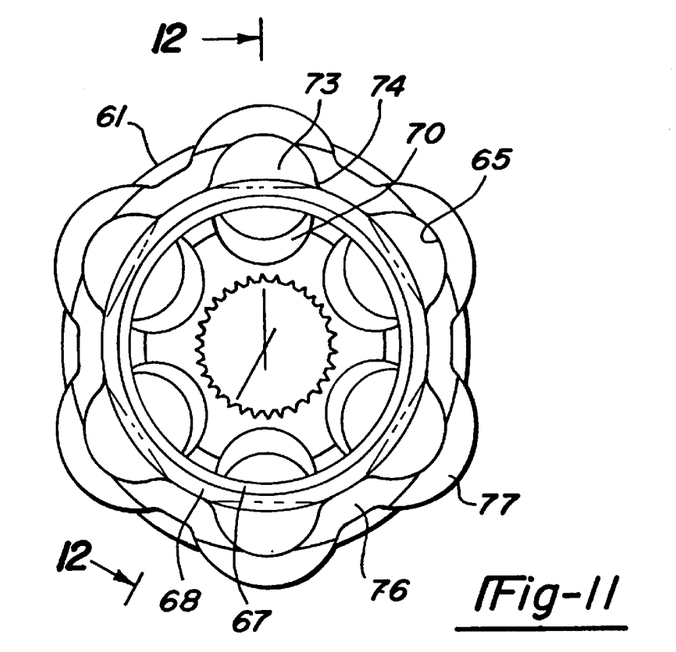
FIG. 11 is an axial view of a fourth embodiment of a joint in accordance with the invention after assembly and after deformation of the outer joint part.
Figure 12:
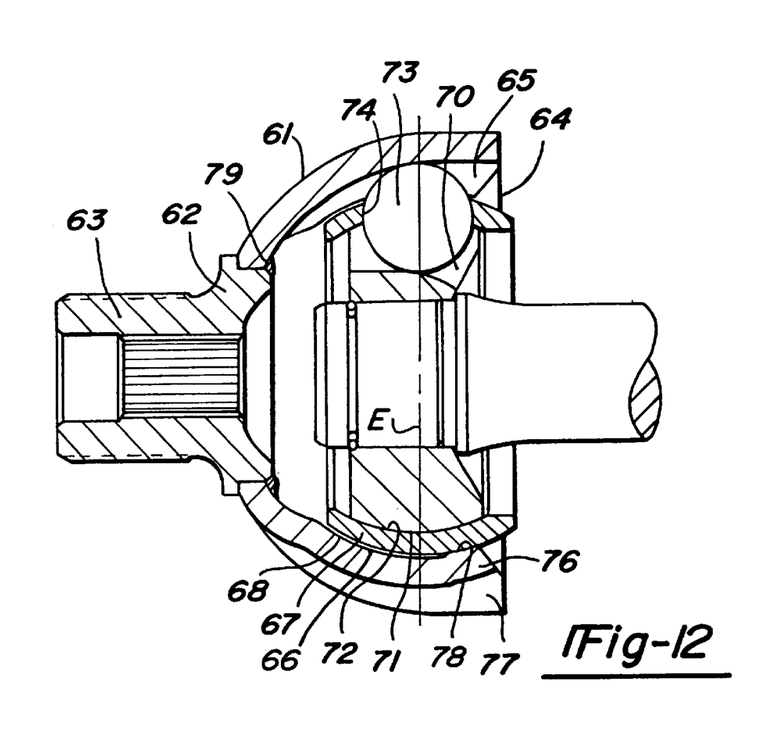
FIG. 12 is a longitudinal section view of FIG. 11 through line 12—12 thereof.

In FIGS. 11 and 12, any details corresponding to those shown in FIGS. 9 and 10 have been provided with reference numbers increased by 20. Reference is made to the contents of the description of FIGS. 9 and 10. In deviation from the joint shown in FIGS. 9 and 10, the base of the outer joint part 61, formed out of plate metal, includes a punched-out aperture 79. A solid shaft journal 63, which forms part of the base 62 of the outer joint part, is inserted into the base aperture 79 from the end opposite the aperture 64 and is secured by welding.

FIGS. 11 and 12 show the joint after completion of the final production stage. The regions 76 are deformed radially inwardly until they contact with the spherical outer face 68 of the cage. This forms cage guiding faces 78 which support the cage axially outwardly towards the aperture 64. The regions 77, which are positioned between the wall regions 76 and form the ball tracks 65, remain undeformed with constant transitions remaining between the respective wall regions. The edges of the tracks 65 in the outer joint part 61 remain unaffected by deformation. The same applies to the tracks 65 as a whole, whose axially undercut-free extension in the longitudinal section is maintained.

Figure 13:
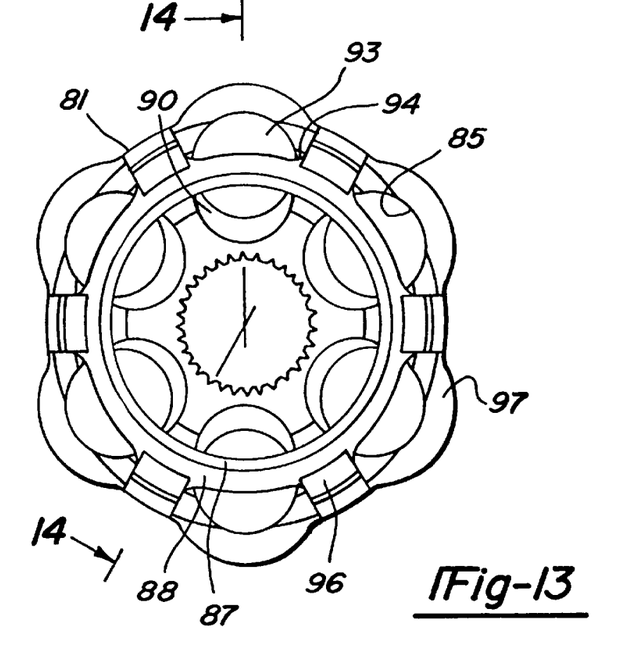
FIG. 13 is an axial view of a fifth embodiment of a joint in accordance with the invention after assembly and after deformation of the outer joint part.
Figure 14:
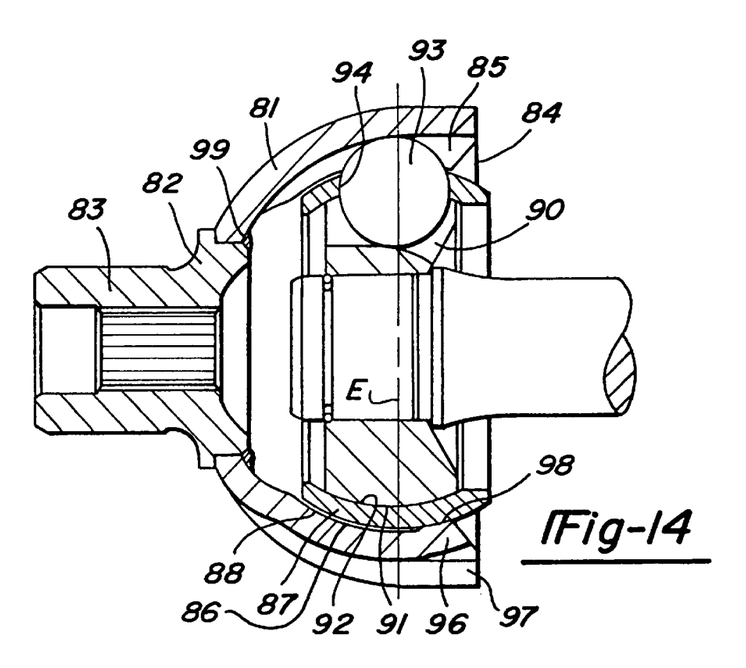
FIG. 14 is a longitudinal section view of FIG. 13 through line 14—14 thereof.

In FIGS. 13 and 14 any parts corresponding to those shown in FIGS. 11 and 12 have been given reference numbers increased by 20. Reference is made to the contents of the description of FIGS. 11 and 12. In deviation therefrom, the radially inwardly deformed wall regions 96 are sheared off tongue-like members relative to the circumferentially interposed regions 97 which remain completely undeformed.

While the above detailed description describes the preferred embodiment of the present invention, the invention is susceptible to modification, variation, and alteration without deviating from the scope and fair meaning of the subjoined claims.

We claim:

1. A method of producing a constant velocity universal ball joint comprising the steps of:

providing a bell-shaped outer joint part open at one end having longitudinally extending circumferentially distributed outer ball tracks on an inner surface of said outer joint part, said outer ball tracks, viewed from the open end, being axially undercut-free, and inner faces in said outer part positioned between said outer ball tracks, and wall region in said outer joint part which starts from the open end being axially limited and arranged between every two outer ball tracks, the circumferential width of each wall region being smaller than the circumferentially directed distance between any two outer ball tracks;

providing an inner joint part with longitudinally extending circumferentially distributed inner ball tracks;

providing torque transmitting balls;

providing a cage, said cage including circumferentially distributed cage windows for holding the balls in a common plane and guiding the balls onto an angle bisecting plane when the respective axes of the outer and inner joint part are articulated relative to one another;

inserting the cage, the inner joint part and the balls into said outer joint part from the open end such that the cage is located radially between the inner joint part and the outer joint part with respective windows, outer ball tracks and inner ball tracks being radially aligned with one another, and each ball located within a respectively radially aligned window, outer track and inner track;

deforming said wall regions radially inwardly into contact with said cage, thereby securing said outer joint part to said cage, wherein:

said deformed wall regions form cage guiding faces positioned between the outer ball tracks, and said cage guiding faces provide support for the cage towards the open end of the outer joint part.

2. The method according to claim 1, wherein said inserting step includes inserting the cage, the balls and the inner joint part as a preassembled unit into the outer joint part.

3. The method according to claim 1, further comprising supporting the outer ball tracks during the deforming operation with supporting means so that said outer ball tracks maintain their shape.

4. The method according to claim 3, and the supporting step includes introducing fingers into the outer ball tracks.

5. The method according to claim 1, wherein the wall regions being radially deformed correspond to central partial regions between two outer ball tracks, said wall regions having at least a width in the circumferential direction, accommodating hardening of said wall regions.

6. The method according to claim 1 deforming the entire wall thickness of the wall regions with steady transitions occurring towards undeformed wall regions.

7. The method according to claim 1, wherein each wall region includes an outer wall portion and an inner wall portion separated by an axial recess extending from the open end, and the deforming step includes deforming only the inner wall portions.

8. The method according to claim 1, forming said wall regions by shearing off the wall from the open-end face of the outer joint part so as to form single tongues.

9. The method according to claim 1, further comprising surface hardening an inner face of the outer joint part before the radial deformation process takes place.

10. The method according to claim 9, wherein the inner face of the outer joint part is a ball track region.

11. The method according to claim 1, and further comprising forming the outer joint part by deep-drawing a plate metal member.

12. The method according to claim 1, and further comprising forming the outer joint part with reduced wall thicknesses in the regions between the outer ball tracks.

13. The method according to claim 1, and further comprising the step of heating the outer joint part prior to the deforming step.

* * * * *

UNITED STATES PATENT AND TRADEMARK OFFICE
CERTIFICATE OF CORRECTION

PATENT NO. : 5,852,864
DATED : December 29, 1998
INVENTOR(S) : Werner Krude and Peter Harz It is certified that error appears in the above-identified patent and that said Letters Patent is hereby corrected as shown below:

Column 4, line 33, kindly delete "track 5"
and substitute therefor --tracks 5--

Column 6, line 44, Claim 1, kindly delete "outer part"
and substitute therefor --outer joint part--

Column 6, line 46, Claim 1, kindly delete "wall region"
and substitute therefor --wall regions--

Signed and Sealed this

Twenty-fourth Day of October, 2000

Attest:

Q. TODD DICKINSON

*Attesting Officer*  *Director of Patents and Trademarks*